United States Patent
Johnson

(10) Patent No.: US 9,230,253 B2
(45) Date of Patent: Jan. 5, 2016

(54) METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES

(71) Applicant: CITICORP CREDIT SERVICES, INC., Long Island City, NY (US)

(72) Inventor: William Johnson, Marietta, GA (US)

(73) Assignee: Citicorp Credit Services, Inc., Long Island City, NY (US)

( * ) Notice: Subject to any disclaimer, the term of this patent is extended or adjusted under 35 U.S.C. 154(b) by 0 days.

(21) Appl. No.: 14/486,594

(22) Filed: Sep. 15, 2014

(65) Prior Publication Data

US 2015/0006307 A1    Jan. 1, 2015

Related U.S. Application Data

(63) Continuation of application No. 13/334,627, filed on Dec. 22, 2011, now Pat. No. 8,844,810, which is a continuation of application No. 12/956,699, filed on Nov. 30, 2010, now Pat. No. 8,157,166, which is a continuation of application No. 12/289,673, filed on Oct. 31, 2008, now Pat. No. 7,878,394.

(60) Provisional application No. 60/996,134, filed on Nov. 2, 2007.

(51) Int. Cl.
*G06K 5/00* (2006.01)
*G06F 17/00* (2006.01)
(Continued)

(52) U.S. Cl.
CPC .............. *G06Q 20/34* (2013.01); *G06Q 20/102* (2013.01); *G06Q 20/20* (2013.01); *G06Q 20/202* (2013.01); *G06Q 20/204* (2013.01); *G06Q 20/3555* (2013.01); *G06Q 20/3572* (2013.01); *G06Q 20/40* (2013.01); *G06Q 20/405* (2013.01); *G06Q 30/0229* (2013.01); *G06Q 30/0237* (2013.01); *G06Q 30/0238* (2013.01); *G06Q 50/22* (2013.01)

(58) Field of Classification Search
USPC .......... 235/375, 380, 383, 449, 451, 492, 493
See application file for complete search history.

(56) References Cited

U.S. PATENT DOCUMENTS

| 7,774,274 B2 | 8/2010 | Jones et al. | |
| 2002/0082866 A1* | 6/2002 | Ladouceur et al. | 705/2 |

(Continued)

OTHER PUBLICATIONS

Mexican Official Action dated Dec. 7, 2011 in related Application No. MX/a/014012, filed Oct. 31, 2008, English Translation, 5 pages.

(Continued)

*Primary Examiner* — Tuyen K Vo
(74) *Attorney, Agent, or Firm* — Eric J. Sophir; Dentons US LLP

(57) ABSTRACT

A computer-implemented method and system for managing transaction card accounts involves enabling a transaction card account by a card issuer for use with pre-defined categories of providers of goods/services and goods/services sold and issuing a transaction card and establishing an associated pre-qualified category card account. Upon receiving data for a transaction with the transaction card at a transaction terminal by a processing platform of the card issuer via a card association processing network, the category of the provider and goods/services is interrogated to determine whether or not the transaction can be posted on the pre-qualified category card account of the cardholder, and the transaction is approved and posted to the pre-qualified category card account if the transaction falls within the pre-qualified category of the cardholder.

20 Claims, 2 Drawing Sheets

(51) Int. Cl.

*G06Q 20/34* (2012.01)
*G06Q 20/10* (2012.01)
*G06Q 20/20* (2012.01)
*G06Q 20/40* (2012.01)
*G06Q 30/02* (2012.01)
*G06Q 50/22* (2012.01)

(56) References Cited

U.S. PATENT DOCUMENTS

| | | | |
|---|---|---|---|
| 2004/0054622 A1 | 3/2004 | Strayer et al. | |
| 2004/0117300 A1 | 6/2004 | Jones et al. | |
| 2004/0172312 A1* | 9/2004 | Selwanes et al. | 705/4 |
| 2005/0035192 A1 | 2/2005 | Bonalle et al. | |
| 2005/0035847 A1 | 2/2005 | Bonalle et al. | |
| 2005/0077350 A1 | 4/2005 | Courtion et al. | |
| 2006/0149579 A1* | 7/2006 | Weild | 705/1 |
| 2006/0253390 A1 | 11/2006 | McCarthy et al. | |
| 2006/0273165 A1 | 12/2006 | Swift et al. | |
| 2007/0007333 A1 | 1/2007 | Foss et al. | |
| 2007/0162381 A1 | 7/2007 | Petralia et al. | |
| 2007/0198352 A1 | 8/2007 | Kannegiesser | |
| 2007/0252002 A1 | 11/2007 | Guillot et al. | |
| 2009/0125323 A1* | 5/2009 | Lakshmanan et al. | 705/2 |
| 2009/0292607 A1 | 11/2009 | Eckert | |
| 2009/0312104 A1 | 12/2009 | McVey | |
| 2014/0297304 A1* | 10/2014 | Nguyen et al. | 705/2 |

OTHER PUBLICATIONS

Mexican Official Action dated Jul. 10, 2012 in related Application No. MX/a/014012, filed Oct. 31, 2008, English Translation, 4 pages.

\* cited by examiner and
METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES

CROSS REFERENCE TO RELATED APPLICATIONS

This application is a continuation application of U.S. patent application Ser. No. 13/334,627, filed Dec. 22, 2011, entitled "METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES," which is a continuation application of U.S. patent application Ser. No. 12/956,699, filed Nov. 30, 2010, entitled "METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES," which is a continuation application of U.S. patent application Ser. No. 12/289,673, filed Oct. 31, 2008, entitled "METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES," which claims the benefit of U.S. Provisional Application No. 60/996,134 filed Nov. 2, 2007, entitled "METHODS AND SYSTEMS FOR MANAGING TRANSACTION CARD ACCOUNTS ENABLED FOR USE WITH PARTICULAR CATEGORIES OF PROVIDERS AND/OR GOODS/SERVICES," all of which are incorporated herein by reference in their entirety.

FIELD OF THE INVENTION

The present invention relates generally to the field of transaction cards, and more particularly to methods and systems for managing transaction card accounts enabled for use with a particular category of providers of goods/services and/or a particular category of goods/services.

BACKGROUND OF THE INVENTION

Private label credit cards are credit cards that have been branded with a specific company name. However, even though the name of a private business is on the front of the card, a card-issuing financial institution such as a bank actually issues and processes private label cards. Further, although they look like store-issued credit cards, private label credit cards have account numbers similar to major credit cards that include a unique sequence that identifies the credit card for a particular card association processing system, such as the MASTERCARD® card association card processing system.

Currently, certain industries are highly distributed in what can be described as a dealer-based type of environment, such as the health care industry in which there are many independent providers or the auto after-market industry in which there are numerous independently owned repair shops. In such an environment, in order for a card-issuing financial institution, such as a bank, to offer private label lending products to such providers, it is necessary for the financial institution to approach each one of those providers individually in order to sign each one up through a merchant services agreement.

In the current environment, it is also necessary for the financial institution to arrange for a merchant acquirer or acquiring bank and processors to process transactions for each one of such providers. In addition, it is necessary for the card-issuing financial institution to perform extensive system development work to enable those independent entities to produce and use private label lending products for their customer. Thus, it is necessary for the card issuer to have an external sales force that goes out to each of these independent providers and signs them up and to provide technology in their offices to enable them to acquire lending relationships and transact on those relationships.

SUMMARY OF THE INVENTION

Embodiments of the present invention provide methods and systems for managing transaction cards accounts enabled for use with a particular category or class of providers of goods/services and/or a particular category or class of goods/services, instead of for use only with individual providers, that leverages a card association's card processing network as well as the indicia used to identify a merchant's type or mode of business and merchandise sold that is suitable for use in an the card association's network.

Embodiments of the invention employ computer hardware and software, including, without limitation, instructions embodied in computer program code encoded on machine readable medium for execution in a processor and memory coupled to the processor, to provide methods and systems for managing transaction card accounts for use with a particular category of providers and/or goods/services in which a card issuer looks for and qualifies and enables transaction card accounts for use with the particular category of providers and/or a goods/services sold according to a category or classification scheme suitable for employment in a transaction card processing environment. The card issuer issues transaction cards that are branded, for example, by the card issuer and establishes associated pre-qualified category card accounts for customers that are limited in use to transactions with the particular pre-qualified category of provider and/or goods/services.

In embodiments of the invention, a customer swipes the customer's card through a card reader of a transaction terminal, such as a POS terminal, in connection with a transaction and the transaction data is processed through the card association processing channels back to the card issuer in the same manner as in a major credit card transaction and with merchant fees that do not exceed merchant fees associated with processing a major credit card transaction. When the transaction data is received by a processing platform of the card issuer, the category of the provider and/or goods/services is interrogated to determine whether or not the transaction can be posted on the pre-qualified category card account. If the transaction falls within the pre-qualified category of providers and/or goods services, the transaction is approved and posted to the pre-qualified category card account, and if not, approval of the transaction is denied. Alternatively, if the transaction does not fall within the pre-qualified category of providers and/or goods services, the transaction may be posted to another of the cardholder's accounts with the card issuer based, for example, on pre-defined parameters.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Figure 1:
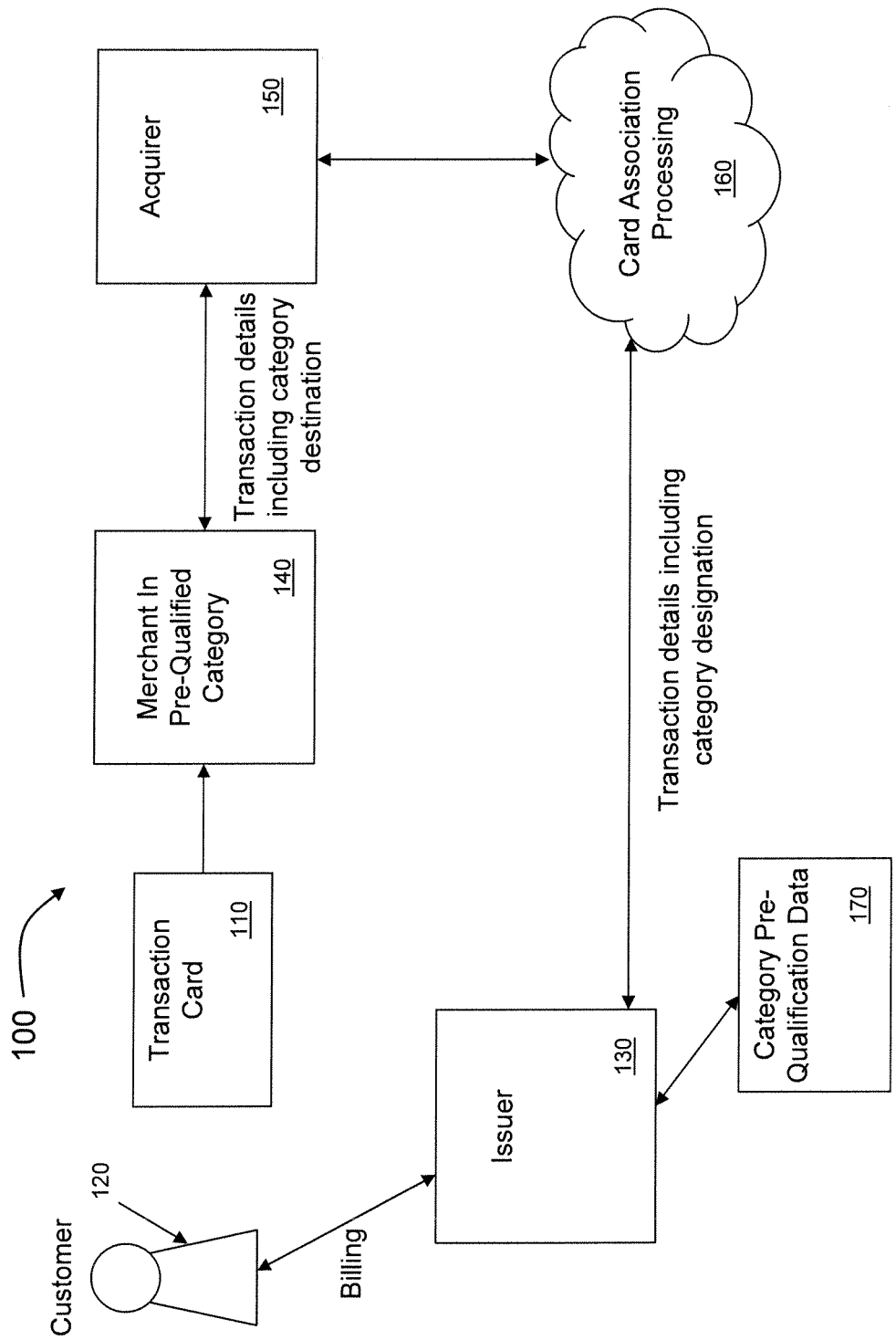
FIG. 1 is a schematic diagram that illustrates an overview example of key components and the flow of information between key components of a system for managing transaction card accounts enabled for use with a particular category of providers of goods/services and/or a particular category of goods/services for embodiments of the invention.

FIG. 1 is a schematic diagram that illustrates an overview example of key components and the flow of information between key components of a system for managing transaction card accounts enabled for use with a particular category of providers of goods/services and/or a particular category of goods/services for embodiments of the invention. Referring to FIG. 1, components of the system 100 for embodiments of the invention include, for example, a transaction card 110 issued to a customer 120 by an issuer 130 usable in transactions via a POS terminal or similar device (not illustrated) of a merchant 140 in a pre-qualified category. Other components include, for example, an acquirer 150 that processes the merchant's credit card authorizations and payments and forwards the data to the card association's processing system 160, which in turn communicates with the card issuer 130, and a processing platform 170 of the card issuer 130 storing category pre-qualification data.

It is to be understood that references herein to components, such as the issuer 130, the merchant 140, the acquirer 150, the card association's processing system 160, and the issuer's processing platform 170 include, without limitation, processors coupled to memory and to other processors likewise coupled to memory via computer networks, as well as computer program products stored in machine readable media and executing in such processors and memory.

Embodiments of the invention involve, for example, a credit card product that leverages a card association's network, such as the MASTERCARD® network, that leverages indicia which identify to which network a card belongs as well as which organization issued the card 110, such as the card association's bank identification (BIN) number ranges, and that leverages classification schemes used to identify a merchant's type or mode of business and the merchandise sold, such as the card association's merchant category code (MCC) which is very similar to the standard industrial classification (SIC) used to specify the industry to which a particular company belongs.

Rather than enabling an individual location, embodiments of the invention propose to enable an entire market. Thus, instead of qualifying each individual provider location separately, embodiments of the invention look, for example, for MCC codes. For example, the card-issuing financial institution 130 looks for the MCC code associated with family practitioners (or some other category of goods/services) and qualifies the category associated with that particular MCC code instead of attempting to qualify each individual family practitioner location separately. It is to be understood that use of the MCC code is intended as an illustrative example only and that embodiments of the invention utilize any classification or categorization of providers of goods/services and/or types of goods/services sold that is suitable for employment in a transaction card processing environment.

From the perspective of the merchant 140, the private label card 110 works and functions exactly the same way as a major credit card bearing the name and logo of one of the major card associations, such as MASTERCARD®, works and the merchant 140 is charged the same merchant fees as if they were processing a major credit card transaction. However, from the perspective of the card-issuing financial institution 130, the card 110 is usable and available only in certain locations, for example, in the particular MCC code category that was qualified by the card issuer 130. Thus, if the qualified category is family practitioners, the card 110 cannot be used in a different category, such as a convenience store or grocery store category.

Embodiments of the invention employ a transaction card 110, such as a plastic credit card, that is branded, for example, by the card-issuing financial institution 130 and limited in use to transactions with a particular category of provider of goods/services and/or for a particular category of goods/services. The card 110 for embodiments of the invention is preferably branded by the card issuer 130 with its own brand but can also, or instead of, be branded with any other suitable non-major credit card brand or brands. This aspect of embodiments of the invention requires the card issuer 130 to market the card to such providers to assure that they understand that the card is acceptable for use in transactions with their businesses at a cost to them that is no greater than the cost of transactions with any major credit card.

It is also to be understood that use of the example of qualification of the family practitioner category of providers is illustrative only and that embodiments of the invention include all possible categories of providers of goods/services, including without limitation auto after-market businesses, child care providers, the travel industry, home entertainment businesses, education related goods/services, to name only a few. Preferably, there are no geographic limitations to use of the card 110 for embodiments of the invention. For example, the card 110 for embodiments of the invention can be used in transactions with any business that falls within the particular category of providers of goods/services, regardless of its location.

Figure 2:
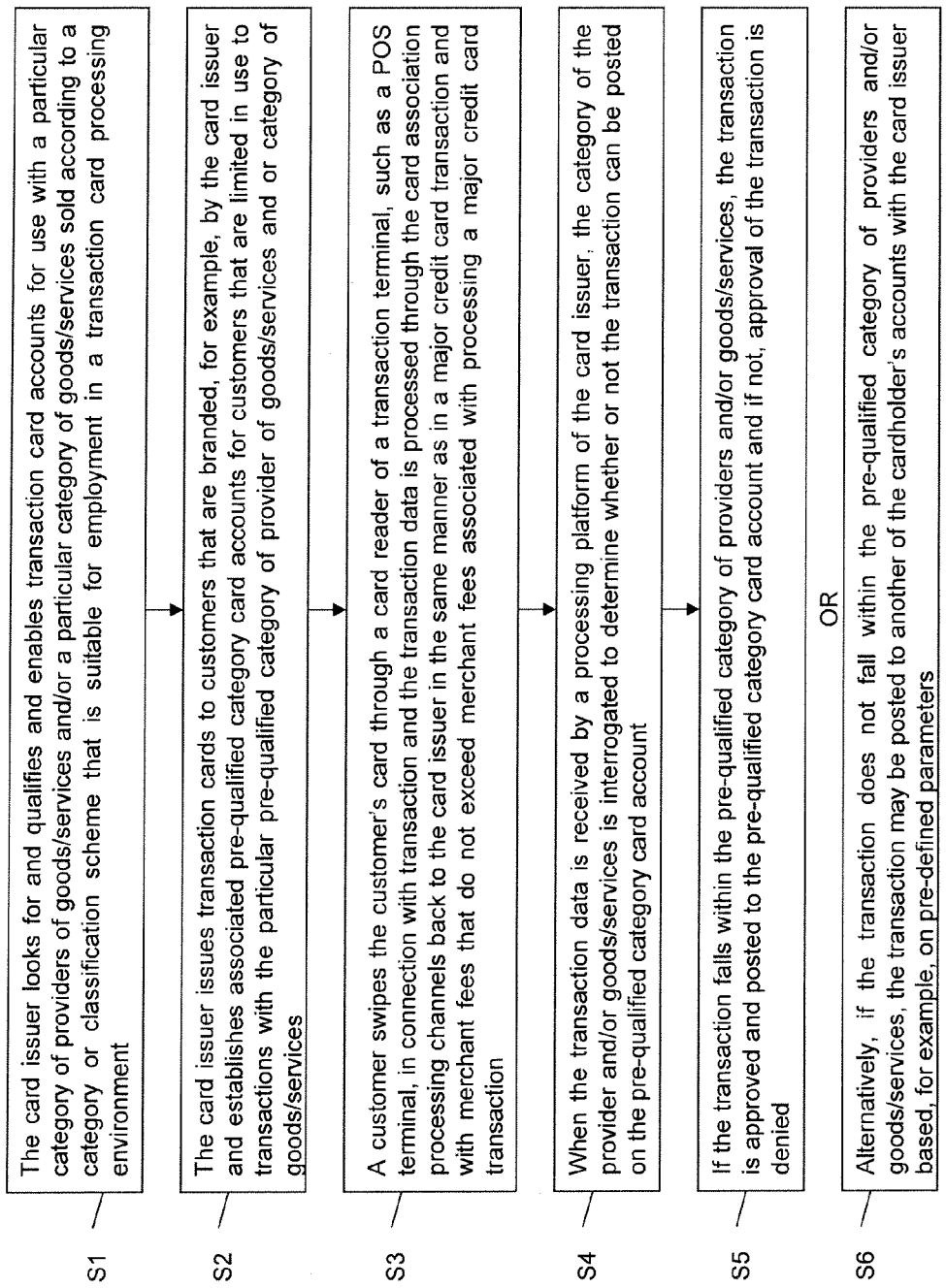
FIG. 2 is a flow chart that illustrates an example of a process of managing transaction card accounts enabled for use with a particular category of providers of goods/services and/or a particular category of goods/services for embodiments of the invention.

FIG. 2 is a flow chart that illustrates an example of a process of managing transaction card accounts enabled for use with a particular category of providers of goods/services and/or a particular category of goods/services for embodiments of the invention. The method is organized as a sequence of modules or steps in the flow chart. However, it is to be understood that these and modules associated with other methods described herein may be rendered for parallel execution or into different sequences of modules.

Referring to FIG. 2, at S1, the card issuer 130 looks for and qualifies and enables transaction card accounts for use with a particular category of providers of goods/services, such as merchant 140, and/or a particular category of goods/services sold according to a category or classification scheme that is suitable for employment in a transaction card processing environment. At S2, the card issuer 130 issues transaction cards, such as transaction card 110, to customers, such as customer 120, that are branded, for example, by the card issuer 130 and establishes associated pre-qualified category card accounts for customers, such as customer 120, that are limited in use to transactions with the particular pre-qualified category of provider of goods/services, such as merchant 140, and or category of goods/services.

Referring further to FIG. 2, at S3, the customer 120 swipes the customer's card 110 through a card reader of a transaction terminal, such as a POS terminal, of the merchant 140 in connection with a transaction, and the transaction data is processed through the card association processing channels 160 back to the card issuer 130 in the same manner as in a major credit card transaction and with merchant fees that do not exceed merchant fees associated with processing a major credit card transaction. At S4, when the transaction data is received by a processing platform 170 of the card issuer 130, the category of the provider and/or goods/services is interrogated to determine whether or not the transaction can be posted on the pre-qualified category card account.

Referring again to FIG. 2, at S5, if the transaction falls within the pre-qualified category of providers and/or goods/services, the transaction is approved and posted to the pre-qualified category card account, and if not, approval of the transaction is denied. Alternatively, at S6, if the transaction does not fall within the pre-qualified category of providers and/or goods/services, the transaction may be posted to another of the accounts of the cardholder 120 with the card issuer 130 based, for example, on pre-defined parameters.

In an alternate aspect of embodiments of the invention, the transaction card 110 is branded or co-branded with a card association brand, but transactions falling within the pre-qualified category of providers of goods/services and/or a category of goods services are posted to the cardholder's qualified private label account, while all other transactions with the card 110 are posted to a regular card association branded account of the cardholder 120 with the card issuer 130. Thus, in the alternative aspect, the card 110 for embodiments of the invention functions as a private label card, for example, in transactions with certain businesses or for certain goods/services, while functioning as a major credit card everywhere else.

The alternative aspect of embodiments of the invention provides cardholders a value proposition associated with the card in a number of ways. For example, the cardholder 120 is able to bucket his or her spending in a particular industry, such as health care. In the health care example, the private label account for the pre-qualified category of providers of health care services, such as merchant 140, may have favorable payment terms, such as deferred payment options (e.g., 18 months-same-as-cash) or extended term payment options, for example, for elective medical procedures or unexpected procedures that are not covered by insurance. At the same time, the major credit card account associated with the same card 110 can have any number of associated rewards programs, such as cash back, rewards points, etc.

The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, the method comprising:
receiving, by a computer of a card issuer from a point-of-sale terminal of a merchant, transaction data associated with a transaction from a transaction card of a cardholder, wherein the transaction data comprises an identification of a category of a product associated with the transaction;
receiving, by the computer of the card issuer from the point-of-sale terminal of the merchant, the transaction data through a card association network for the transaction card, the transaction data comprising the identification of the category of the product;
comparing, by the computer of the card issuer, the identification of the category of the product to a pre-qualified category of products associated with the transaction card of the cardholder;
transmitting, from the computer of the card issuer to the point-of-sale terminal of the merchant, approval of the transaction as a health care transaction when the product is categorized in a pre-qualified health care category, and approving, by the card issuer, the transaction as the health care transaction; and
transmitting, from the computer of the card issuer to the point-of-sale terminal of the merchant, approval of the transaction as a general transaction when the product is not categorized in a pre-qualified health care category, and approving, by the card issuer, the transaction request as the general transaction.

2. The computer-implemented method according to claim 1, wherein the transaction card is branded by the card issuer.

3. The computer-implemented method according to claim 1, wherein an account associated with the transaction card is pre-qualified for transactions associated with a location.

4. The computer-implemented method according to claim 3, wherein approving the transaction further comprises determining whether the location for the merchant identified in the transaction data is the same location that is pre-qualified for the account.

5. The computer-implemented method according to claim 1, further comprising posting, by the computer of the card issuer, payment to a second account of the cardholder if the transaction is denied.

6. The computer-implemented method according to claim 5, wherein the second account is a card association branded account of the cardholder.

7. The computer-implemented method according to claim 3, wherein the location is a geographic location.

8. The computer-implemented method according to claim 1, wherein the transaction card is a private label card.

9. The computer-implemented method according to claim 1, wherein the transaction data further comprises a code to identify a location of the merchant.

10. The computer-implemented method according to claim 9, wherein identifying the location of the merchant further comprises identifying the code in the transaction data.

11. A computer-implemented method, the method comprising:
receiving, by a computer of a card issuer from a point-of-sale terminal of a merchant, transaction data associated with a transaction from a transaction card of a cardholder, wherein the transaction data comprises an identification of a category of a service;
receiving, by the computer of the card issuer from the point-of-sale terminal of the merchant, the transaction data through a card association network for the transaction card, the transaction data comprising the identification of the category of the service;
comparing, by the computer of the card issuer, the identification of the category of the service to a pre-qualified category of services associated with the transaction card of the cardholder;

transmitting, from the computer of the card issuer to the point-of-sale terminal of the merchant, approval of the transaction as a health care transaction when the service is categorized in a pre-qualified health care category and approving, by the card issuer, the transaction as the health care transaction; and transmitting, from the computer of the card issuer to the point-of-sale terminal of the merchant, approval of the transaction as a general transaction when the service is not categorized in a pre-qualified health care category, and approving, by the card issuer, the transaction as the general transaction.

12. The computer-implemented method according to claim 11, wherein the transaction card is branded by the card issuer.

13. The computer-implemented method according to claim 11, wherein an account associated with the transaction card is pre-qualified for transactions associated with a location.

14. The computer-implemented method according to claim 13, wherein approving the transaction further comprises determining, by the computer of the card issuer, whether a location for the merchant indicated in the transaction data is the same location that is pre-qualified for the account.

15. The computer-implemented method according to claim 11, further comprising posting, by the computer of the card issuer, payment to a second account of the cardholder if the transaction is denied.

16. The computer-implemented method according to claim 15, wherein the second account is a card association branded account of the cardholder.

17. The computer-implemented method according to claim 13, wherein the location is a geographic location.

18. The computer-implemented method according to claim 11, wherein the transaction card is a private label card.

19. The computer-implemented method according to claim 11, wherein the transaction data further comprises a code to identify a location of the merchant.

20. The computer-implemented method according to claim 19, wherein identifying the location of the merchant further comprises identifying the code in the transaction data.

* * * * *